United States Patent [19]
Hou et al.

[11] Patent Number: 5,838,313
[45] Date of Patent: Nov. 17, 1998

[54] MULTIMEDIA-BASED REPORTING SYSTEM WITH RECORDING AND PLAYBACK OF DYNAMIC ANNOTATION

[75] Inventors: Tai-Yuan Hou, Robbinsville; Wei-Kwan Vincent Su, Princeton, both of N.J.; Thomas Meissner, Herzogenausrach, Germany; Arding Hsu, Kendall Park, N.J.

[73] Assignees: Siemens Corporate Research, Inc., Princeton, N.J.; Siemens Aktiengesellschaft, Munich, Germany

[21] Appl. No.: 560,566

[22] Filed: Nov. 20, 1995

[51] Int. Cl.⁶ .................................................. G06T 11/00
[52] U.S. Cl. .......................................... 345/302; 707/512
[58] Field of Search ..................................... 395/133–139, 395/118; 345/302, 433–439, 418; 707/512

[56] References Cited

U.S. PATENT DOCUMENTS

| | | | |
|---|---|---|---|
| 5,440,678 | 8/1995 | Eisen et al. | 395/154 |
| 5,483,468 | 1/1996 | Chen et al. | 395/118 |
| 5,526,407 | 6/1996 | Russell et al. | 379/89 |

FOREIGN PATENT DOCUMENTS

WO 89/11693  11/1989  WIPO .

OTHER PUBLICATIONS

Article entitled "Graphical Representation of Medical Information in the Visual Chart", by Harold I. Litt et al., published Nov. 6, 1994, pp. 252–257.

Article entitled "Multimedia E–mail systems for computer–assisted radiological communication", by E. Bellon et al., Medical Informatics (Apr. 1994), vol. 19, No. 2, pp. 139–148.

IBM Technical Disclosure Bulletin entitled "Shared White-Board Approach to Multimedia Document Annotations", vol. 38, No. 9, Sep. 1995, pp. 279.

*Primary Examiner*—Almis R. Jankus
*Attorney, Agent, or Firm*—Donald B. Paschburg

[57] ABSTRACT

A multimedia-based reporting system utilizes a command interpreter and an annotation input interpreter to receive inputs from a user and forwards the inputs to an open report handler, a save report handler, a delete current report handler, a mail report handler, an attach media handler, a print report handler, a static annotation handler, a dynamic annotation handler including recording and playback and an annotation on annotation handler. The static annotation handler allows the user to add drawings and text to the report. The dynamic annotation handler allows the user to record/playback annotations from the annotation input interpreter. The annotation on annotation handler allows the user to record a session of dynamic annotation based on a segment of existent dynamic annotation.

18 Claims, 15 Drawing Sheets

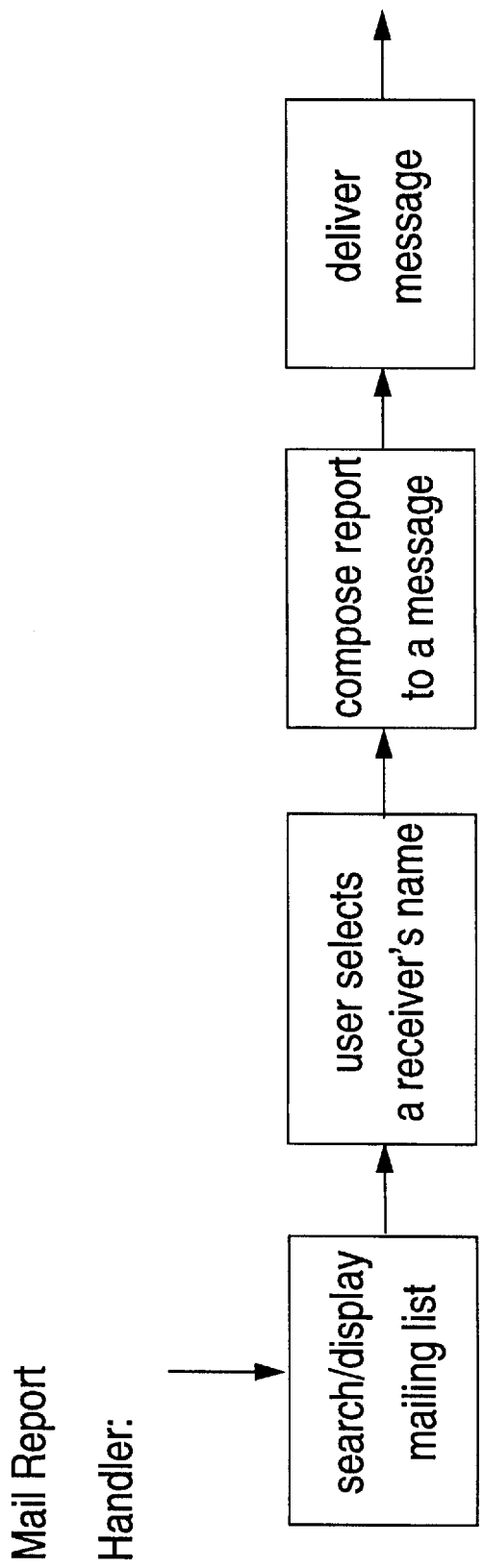

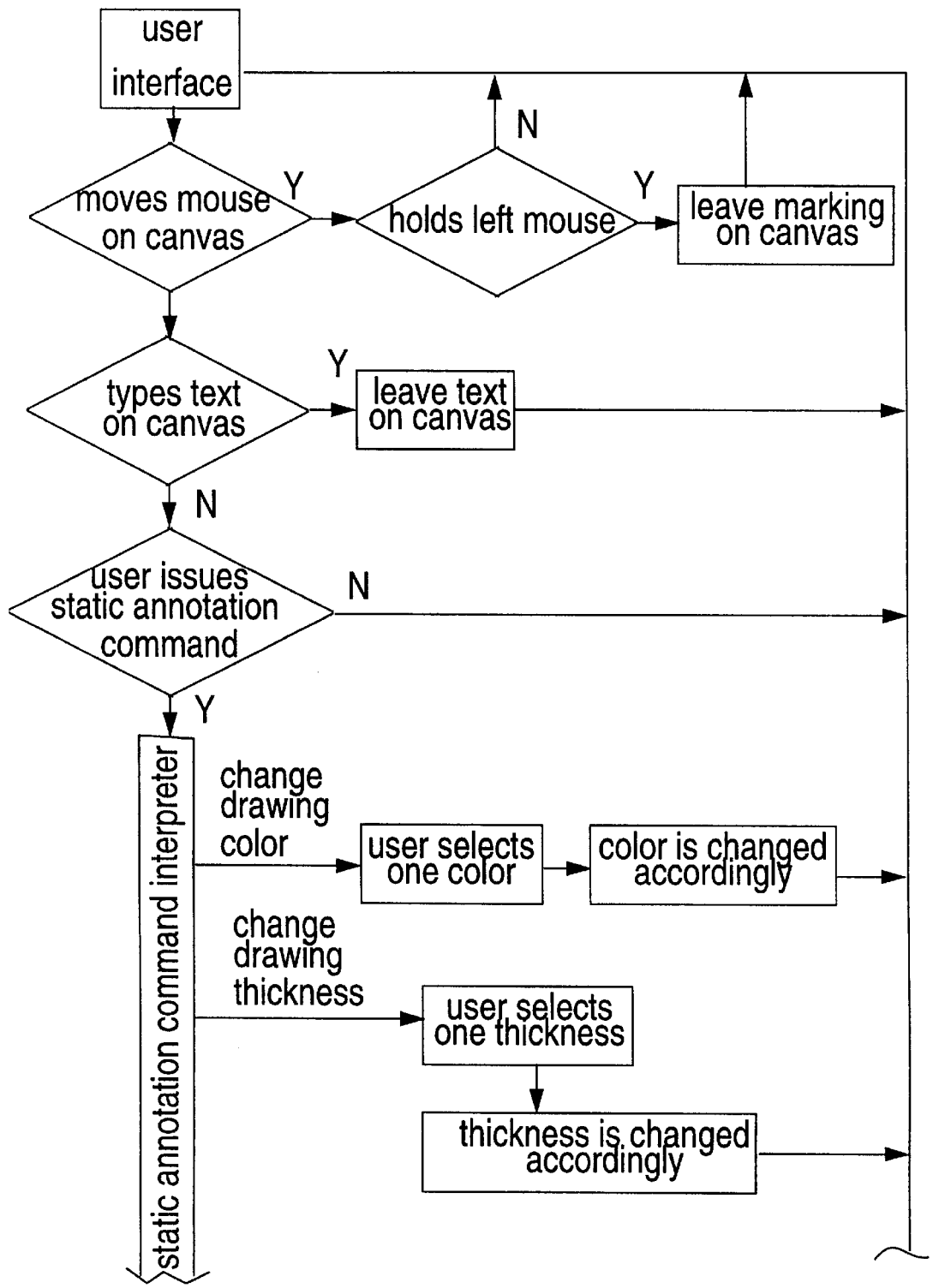

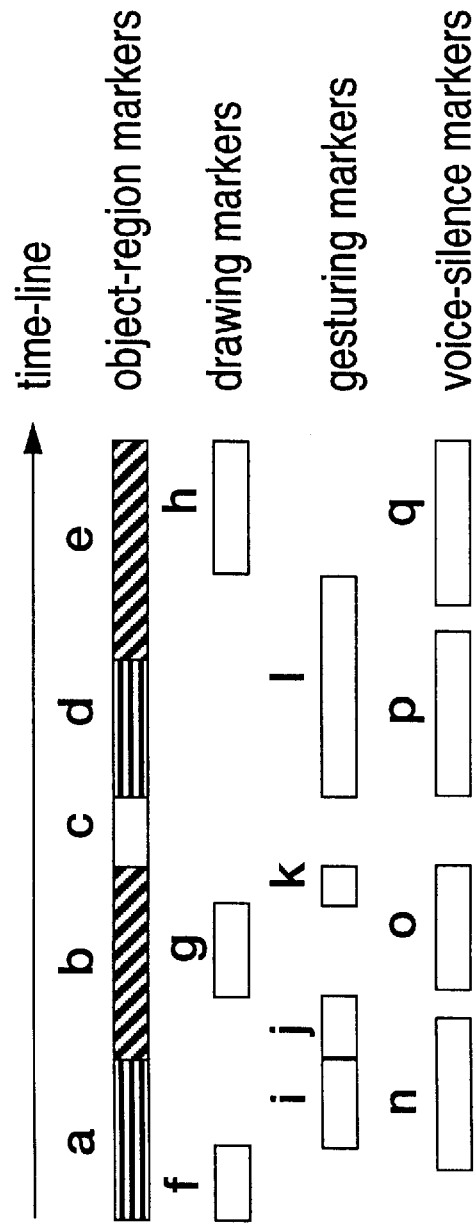
Figure 14. Markers to Segment Annotations

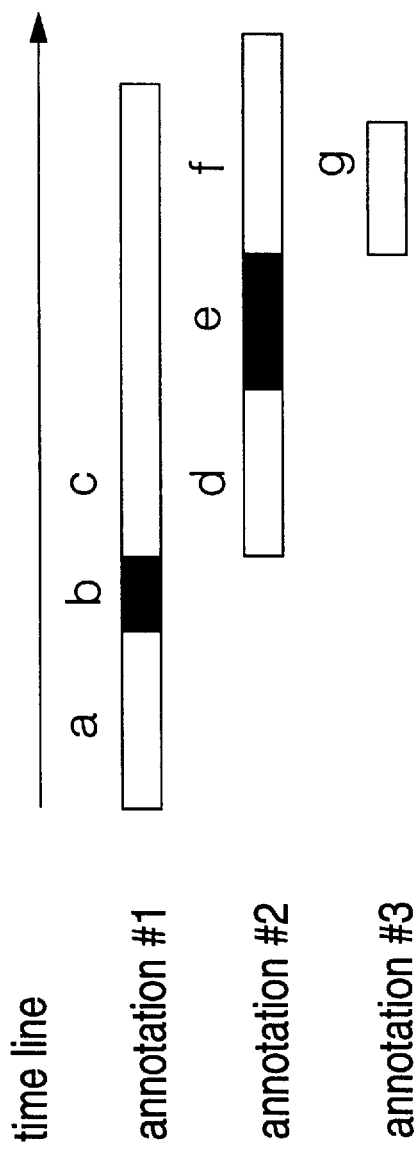
Figure 15. Annotation on Annotation

MULTIMEDIA-BASED REPORTING SYSTEM WITH RECORDING AND PLAYBACK OF DYNAMIC ANNOTATION

BACKGROUND OF THE INVENTION

1. Field of the Invention

The present invention relates to the creation and usage of multimedia-based reports and more particularly to using multimedia technologies to create reports which can consist of dynamic annotations on multiple images.

2. Background of the Invention

A reporting process is engaged, as an example, by medical specialists to retrieve, view, enhance, and interpret images of patient information, review patient demographics, and dictate or "annotate" their diagnosis to produce a final medical report that can be accessed by other physicians for review or consultation. Within the prior art, the term annotation is commonly used for two different meanings. The first meaning refers to the attachment of an object, such as text, audio, or video, to a document. One example is identified in "ARZTBRIEF: Generating Medical Reports in a Multimedia Environment", Lecture Notes in Medical Informatics 45, Proceedings of Medical Informatics Europe, pp. 900–903, where the system of Heart Centre Northshine-Westphalia includes voice and text annotations. Voice is commonly used for two purposes only, playing back without synchronizing with other related media, or transcribing to text for a text record. The second meaning for annotation refers to the artifact of the drawing/typing on the displayed objects. One example is identified in "A Multi-User Document Review Tool" by J. L. Koszarek, T. L. Lindstrom, J. R. Ensor, and S. R. Ahuja, Proceedings of the IFIP, WG 8.4 Conference, 1990, pp. 207–214. In the Collaborative Annotator System of AT&T, graphics annotations are composed of highlighter pens, text, and yellow stickeys which can be drawn on the document.

With these two annotation techniques, reports can include multiple media data with static graphics drawings on the report as well as attachments. However, these prior art techniques are unable to utilize temporal features of visual annotations in such a way to record the annotation process along with the annotator's voice, and to playback the recorded result. It is an object of the present invention, to provide such a "dynamic annotation" technique.

Medical reports of the prior art can include multimedia data. One such report is identified in "Graphical Representation of Medical Information in the Visual Chart", by Harold I. Litt and John W. Loonsk, 1994 IEEE Seventh Symposium on Computer-Based Medical Systems, Jun. 10–12, 1994 Winston-Salem, N.C. pp. 252–257. For example, in the Visual Chart system of SUNY at the Buffalo School of Medicine and Biomedical Sciences, multimedia data can be text, text lists, tables, graphical representation of quantitative data, and icons. Another report is identified in "An Electronic Medical Record System for a Hospital Information System", Y. Yamashita, K. Yamamoto, M. Sudo, Y. Okada, M. Nagata, and T. Takahashi, MEDINFO '92, K. C. Lun et. al. (editors), pp. 741–745. In the E.M.R. of the Fukui Medical School, multimedia data can be text, numerical, illustrations and graphical information.

For these existing systems, there is no mechanism to make a visual arrangement for related multimedia data included within a report. It is an object of the present invention, to make the dynamic annotation worthwhile by providing a way for the user to arrange multi-media data in a convenient manner so that related media data can be close together when dynamic annotation is performed.

To playback a session of dynamic annotation, the synchronization for annotator's actions and voice is an important issue. The synchronization techniques of the prior art are related to synchronization between audio and video signals. An example is identified in U.S. Pat. No. 5,323,272 entitled Timing Control for Digital Audio Buffer in Video Interface, by inventor K. L. Klingler. In this patent, the timing control for the digital audio buffer is used to balance the audio timing for synchronizing with video. Another example is found in "Feedback Techniques for Continuity and Synchronization in Multimedia Information Retrieval", by P. Venkat Rangan, Sronivas Ramanathan, Srihari Sampathkumar, ACM Transactions on Information Systems, Vol. 13, No. 2, April 1995, pp. 145–176. In this article, the synchronization issue is addressed for data sent from a multimedia information server to clients across the network.

For dynamic annotations, there is a unique synchronization issue which has not been addressed before. The issue can be identified as how to playback the dynamic annotation with correct timing for the annotator's actions and voice. This issue is particularly important when the CPU has to handle other processes. It is an object of the present invention to provide a technique to address this issue.

For the prior art e-mail system, an individual can reply to an e-mail by either creating a new message or by inserting new information in the existing e-mail. It is an object of the present invention to provide a new technique to reply to a session of dynamic annotation without altering the content of the original session.

Thus, an overall object of the present invention is to provide a natural way for an individual to have a report which consists of the individual's visual and audio annotations. These annotations can be synchronized for playing back. Another object of the present invention is to provide a mechanism for an individual to reply to a session of a dynamic annotation.

SUMMARY OF THE INVENTION

A multimedia-based reporting system of the present invention includes the following components. A command interpreter receives inputs from a user and forwards the inputs to an open report handler, a save report handler, a delete current report handler, a mail report handler, an attach media handler, a print report handler or the exit. An annotation input interpreter receives inputs from the user and forwards the inputs to a static annotation handler, a dynamic annotation handler including recording and playback and an annotation on annotation handler.

The save report handler generates report files for storage and the print report handler generates a print file for printing. The attach media handler attaches different types of media, from an external media source, to the report. The mail report handler generates an e-mail message for delivery. The static annotation handler allows the user to add drawings and text to the report. The dynamic annotation handler allows the user to record/playback annotations from the user input. The annotation on annotation handler allows the user to record a session of dynamic annotation based on a segment of existent dynamic annotation. A report viewer displays the contents of the report.

By utilizing the present invention, an individual can perform the following tasks: (1) an individual can create reports by including multiple media data; (2) a special region (called canvas) on the display is provided for the individual to perform media-related actions; (3) the individual can place multimedia data objects into the canvas; (4)

data objects in the canvas can be arbitrarily arranged; (5) the individual can freely draw/delete lines, graphics as well as type/delete text on the canvas; (6) the individual's actions on the canvas, such as moving data objects, drawing, or typing, can be recorded with the individual's voice; (7) the recorded session can be played back so that the individual's actions on the canvas can be synchronized with the playback of the individual's recorded voice; (8) the individual can send the report to other individuals via an e-mail system; (9) the individual who receives a report which has a recorded annotation session can reply it back with a new annotation session which is based on the spatial/temporal properties of the replied annotation session.

BRIEF DESCRIPTION OF THE DRAWINGS

FIG. 4 illustrates the mail report handler of the present invention.

FIG. 14 illustrates the markers used for segmenting annotations.

FIG. 15 illustrates the relations among annotations and reply annotations using the annotation on annotation technique.

DETAILED DESCRIPTION OF THE INVENTION

Figure 1:
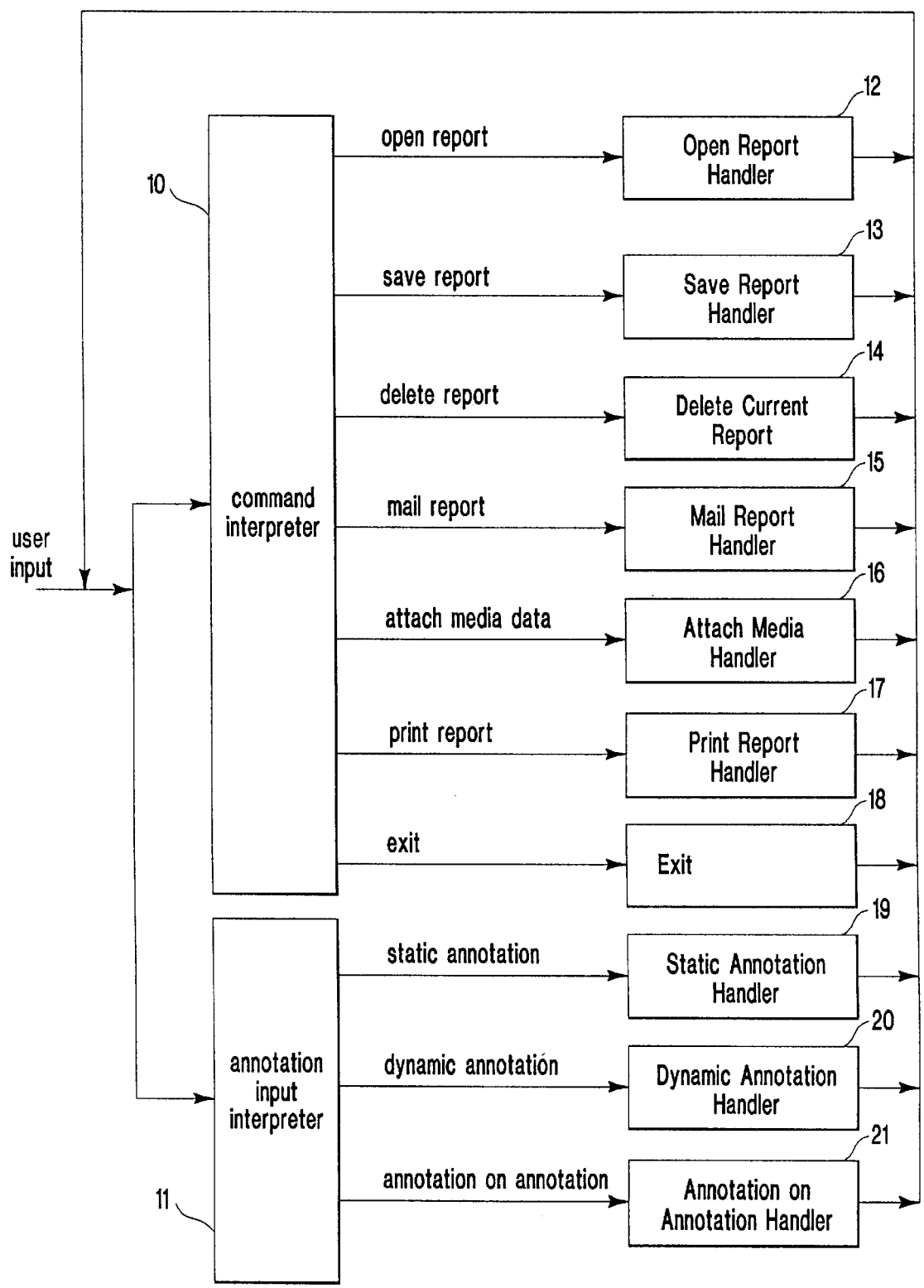
FIG. 1 illustrates a flowchart of one embodiment of the overall system of the present invention.

FIG. 1 illustrates an overall flow diagram of the present invention. The command interpreter 10 and the annotation input interpreter 11, receive a user input command from the individual utilizing the system. The command interpreter 10 routes the command to either the open report handler 12, the save report handler 13, the delete current report handler 14, the mail report handler 15, the attach media handler 16, the print report handler 17 or the exit 18. The annotation input interpreter 11 routes the input to either the static annotation handler 19, the dynamic annotation handler 20 or the annotation on annotation handler 21.

Figure 2:
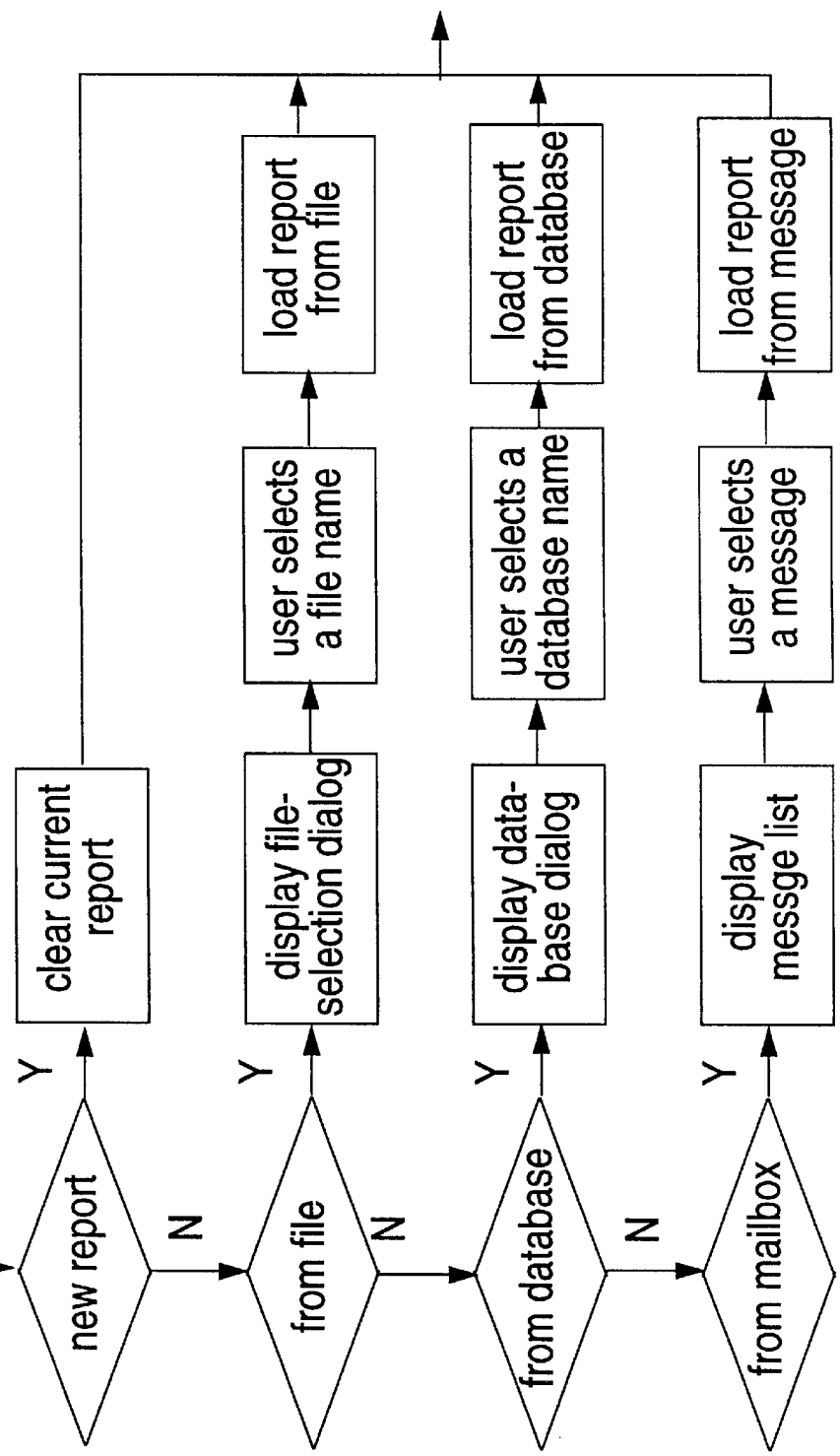
FIG. 2 illustrates the open report handler of the present invention.

FIG. 2 illustrates the open report handler (12 of FIG. 1) of the present invention. The open report handler receives an input from the command interpreter. Within the open report handler, a decision is made as to whether the report is a new report and if there is a new report, the current report is cleared. If there is not a new report, a decision is made as to whether the report is from a file. If the report is from a file, the file selection dialog is displayed, the user selects a file name and the report is loaded from the file. If the report is not from the file, a decision is made as to whether the report is from the database. If the report is from the database, the database dialog is displayed, the user will select a database name and the report will be loaded from the database. If the report is not from the database, then a decision is made as to whether the report is from the mailbox. If the report is from the mailbox, the message list is displayed, the user selects a message and the report is loaded from the message.

Figure 3:
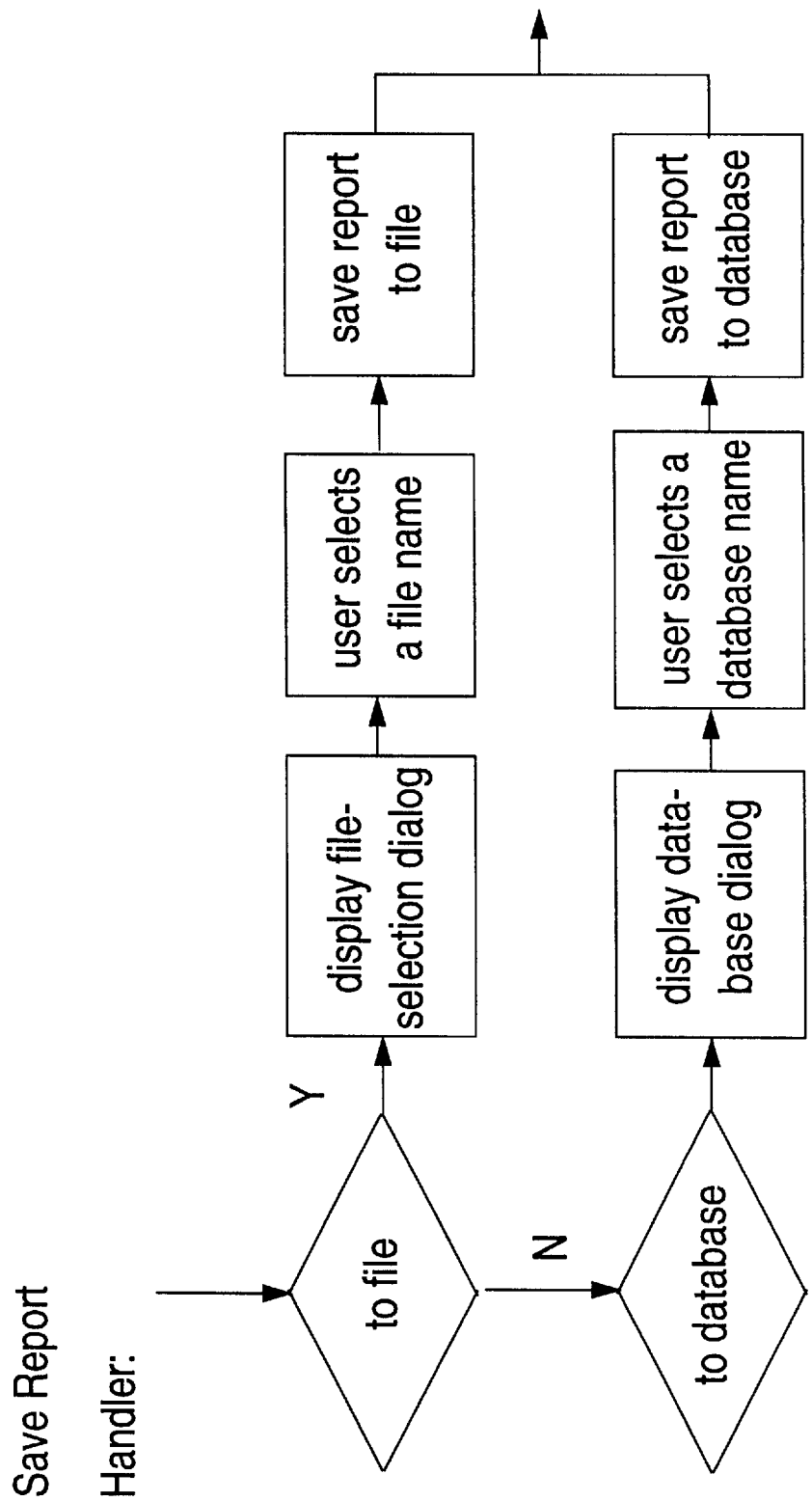
FIG. 3 illustrates the save report handler of the present invention.

FIG. 3 illustrates the save report handler (13 of FIG. 1) of the present invention. The save report handler receives an input from the command interpreter. Within the save report handler a decision is made as to whether the report should be saved to a file. If there is a decision to save the report to the file, the file selection dialog is displayed, the user selects a file name and the report is saved to the file. If a decision is made not to save the report to the file, a decision is made to save the report to the database. The database dialog is displayed, the user selects a database name and the report is saved to the database.

FIG. 4 illustrates the mail report handler (15 of FIG. 1) of the present invention. The mail report handler receives an input from the command interpreter. Within the mail report handler, the mailing list is searched and displayed, the user selects a receiver's name, a report is composed to a message and the message is delivered.

Figure 5:
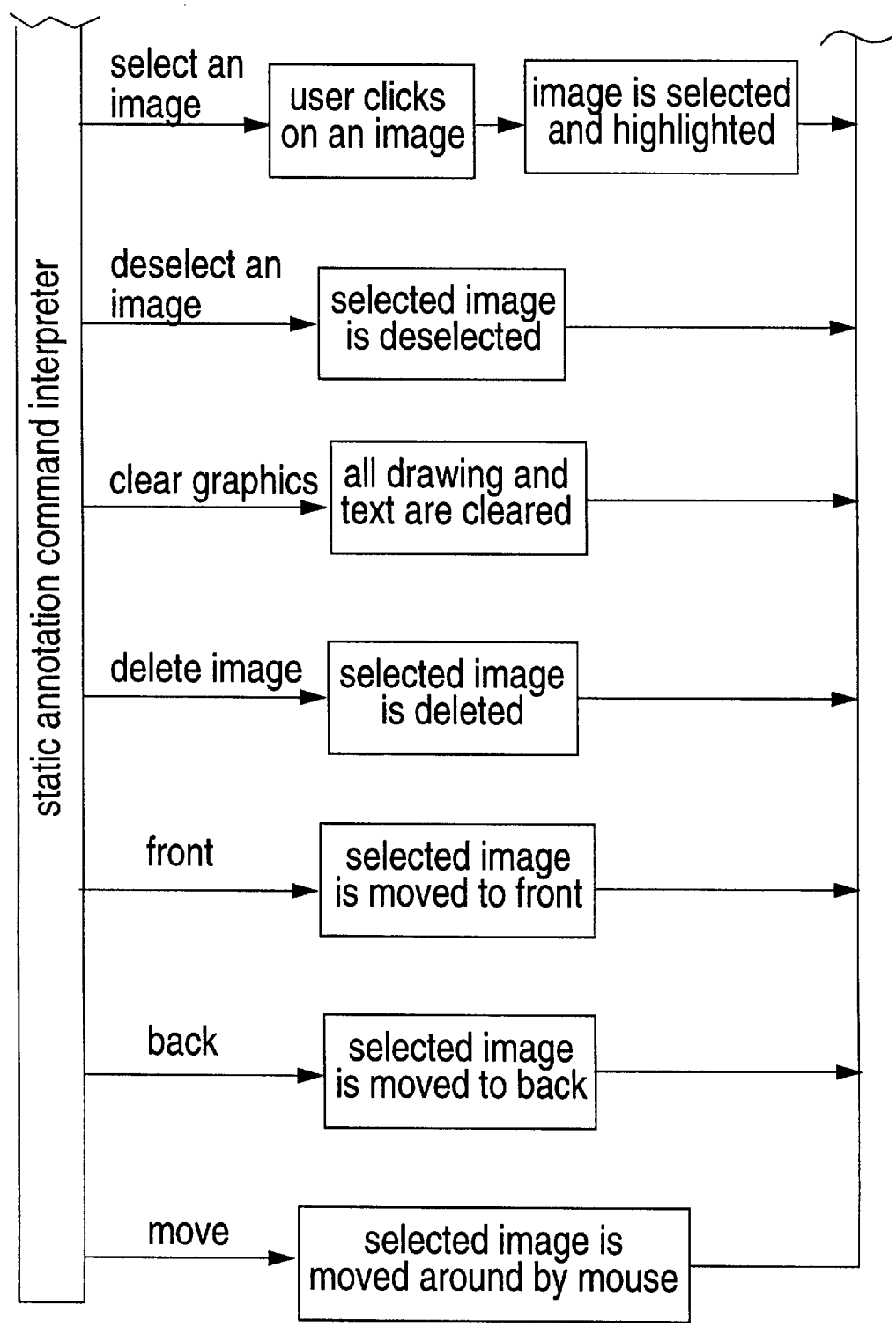
FIG. 5 illustrates the static annotation handler of the present invention.

FIG. 5 illustrates the static annotation handler (19 of FIG. 1) of the present invention. The static annotation handler receives an input from the annotation input interpreter into the user interface. Within the static annotation handler, a decision is made as to whether the mouse moved on the canvas. If the mouse did move, then a decision is made as to whether the user held the left mouse button. If the user did hold the left mouse button, the marking is left on the canvas. If the user did not hold down the left mouse button, then the flow returns to the user interface. If the user did not move the mouse on the canvas, then a decision is made as to whether the user typed text on the canvas. If the user typed text, then the text is left on the canvas and the flow returns to the user interface. If the user did not type text on the canvas, then a decision is made as to whether the user issued a static annotation command. If the user did not issue a static annotation command, the flow returns to the user interface. If the user did issue a static annotation command, the static annotation command interpreter routes the command. If there is a command to change the drawing color, the user selects one color, the color is changed accordingly and the flow returns to the user interface. If there is a change drawing thickness command, the user selects one thickness, the thickness is changed accordingly and the flow returns to the user interface. If there is a command to select an image, the user clicks on an image, the image is selected and highlighted and the flow returns to the user interface. If there is a command to deselect an image, the selected image is deselected and the flow returns to the user interface. If there is a command to clear the graphics, all drawings and text are cleared and the flow returns to the user interface. If there is a command to delete an image, the selected image is deleted and the flow returns to the user interface. If there is a command to move a selected image to the front of other images, the selected image is moved to the front and the flow returns to the user interface. If there is a command to move a selected image to the back, the selected image is moved to the back and the flow returns to the user interface. If there is a command to move a selected image, the selected image is moved around by the mouse and the flow returns to the user interface.

Within the dynamic annotation handler 17 of FIG. 1, a decision is made as to whether there is a recording or a playback. Recording and playing back are discussed in FIGS. 10 and 12 respectively.

Figure 6:
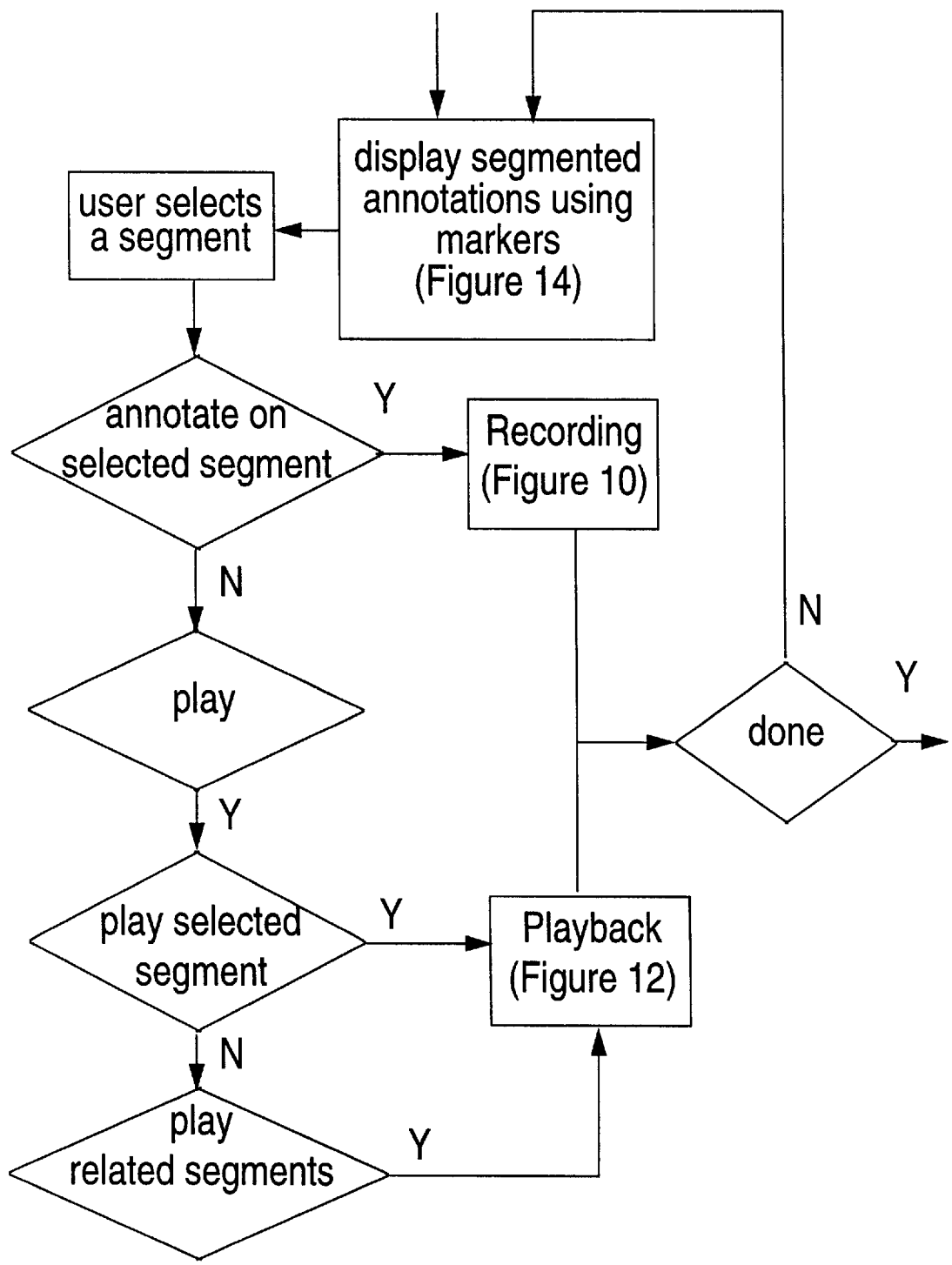
FIG. 6 illustrates the annotation on annotation handler of the present invention.

FIG. 6 illustrates the annotation on annotation handler (21 of FIG. 1). The annotation on annotation handler receives an input from the annotation input interpreter and displays segmented annotations using the markers described in FIG. 14. The annotation on annotation handler operates by having the user select a segment. There is a decision as to whether the selected segment should be annotated. If the segment should be annotated, the flow follows that described in recording, FIG. 10. If there is a decision to not annotate, then a decision is made as to whether to play the segment. If the decision is made to play the segment, then a decision is made as to whether to play one segment or to play related segments. In either case, the flow follows that described in playback, FIG. 12. After recording or playback, a decision is made as to whether the annotation on annotation procedure is completed. If it is completed, the annotation on annotation handler is exited. If it is not completed, the flow returns to displaying segmented annotations using the markers discussed above.

Figure 7:
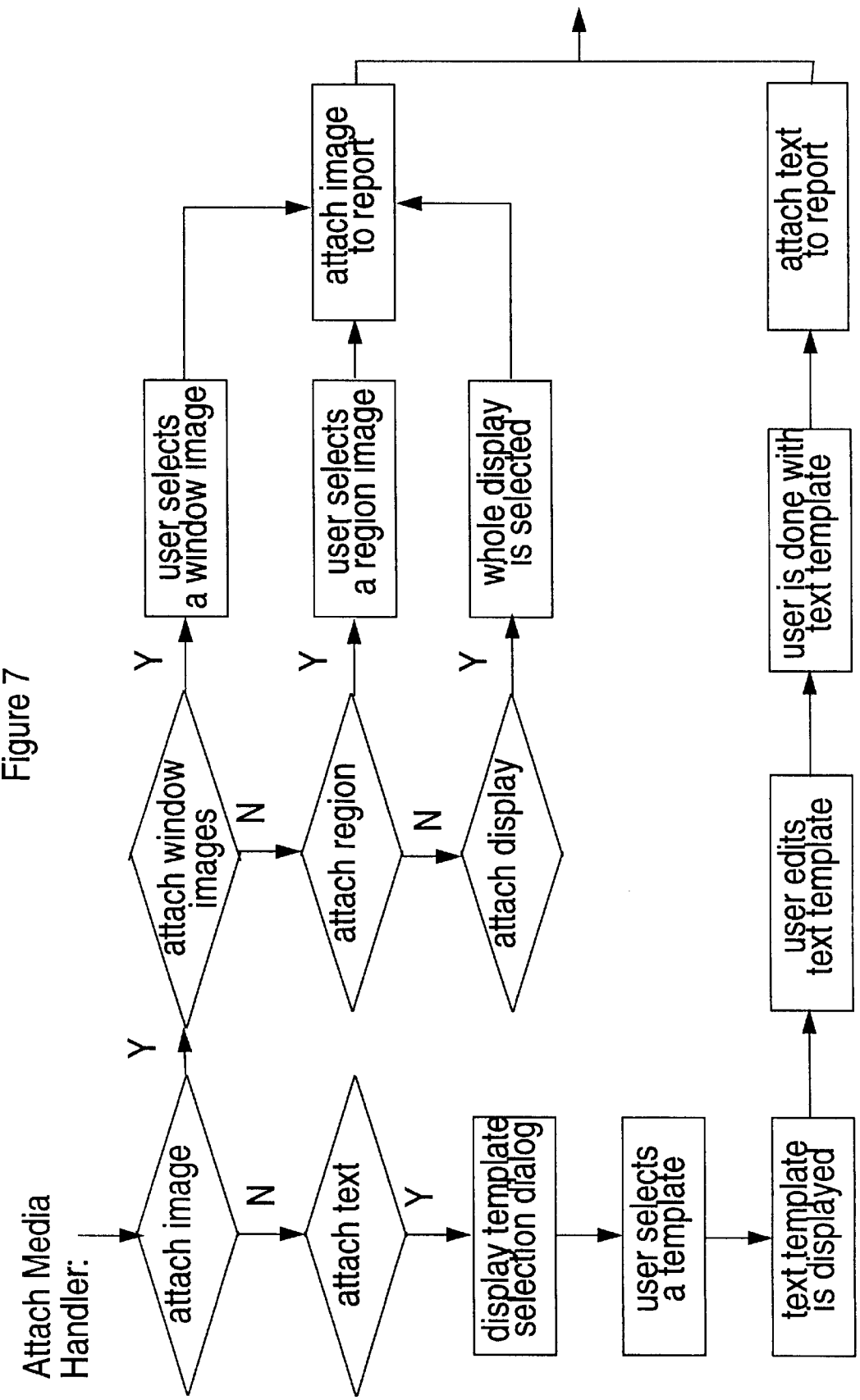
FIG. 7 illustrates the attach media handler of the present invention.

FIG. 7 illustrates the attach media handler (16 of FIG. 1). The attach media handler receives an input from the annotation input interpreter. Within the attach media handler, a decision is made as to whether to attach an image. If the decision is made to attach an image, then a decision is made as to whether to attach window images. If a decision is made to attach window images, then the user selects a window image and the image is attached to the report. If a decision is made to not attach a window image, then a decision is made as to whether to attach a region. If a decision is made to attach the region, the user selects a region image and the image is attached to the report. If a decision is made to not attach the region, then a decision is made as to whether to attach a display. If a decision is made to attach the display, the whole display is selected and the image is attached to the report. If a decision is made to not attach the image, then a decision is made as to whether to attach text. If a decision is made to attach text, the template selection dialog is displayed, the user selects a template, the text template is displayed, the user edits the text template, the user is done with the text template and the text is attached to the report. After the image or text is attached to the report, the attach media handler is exited. An attached image can be placed in the canvas.

Figure 8:
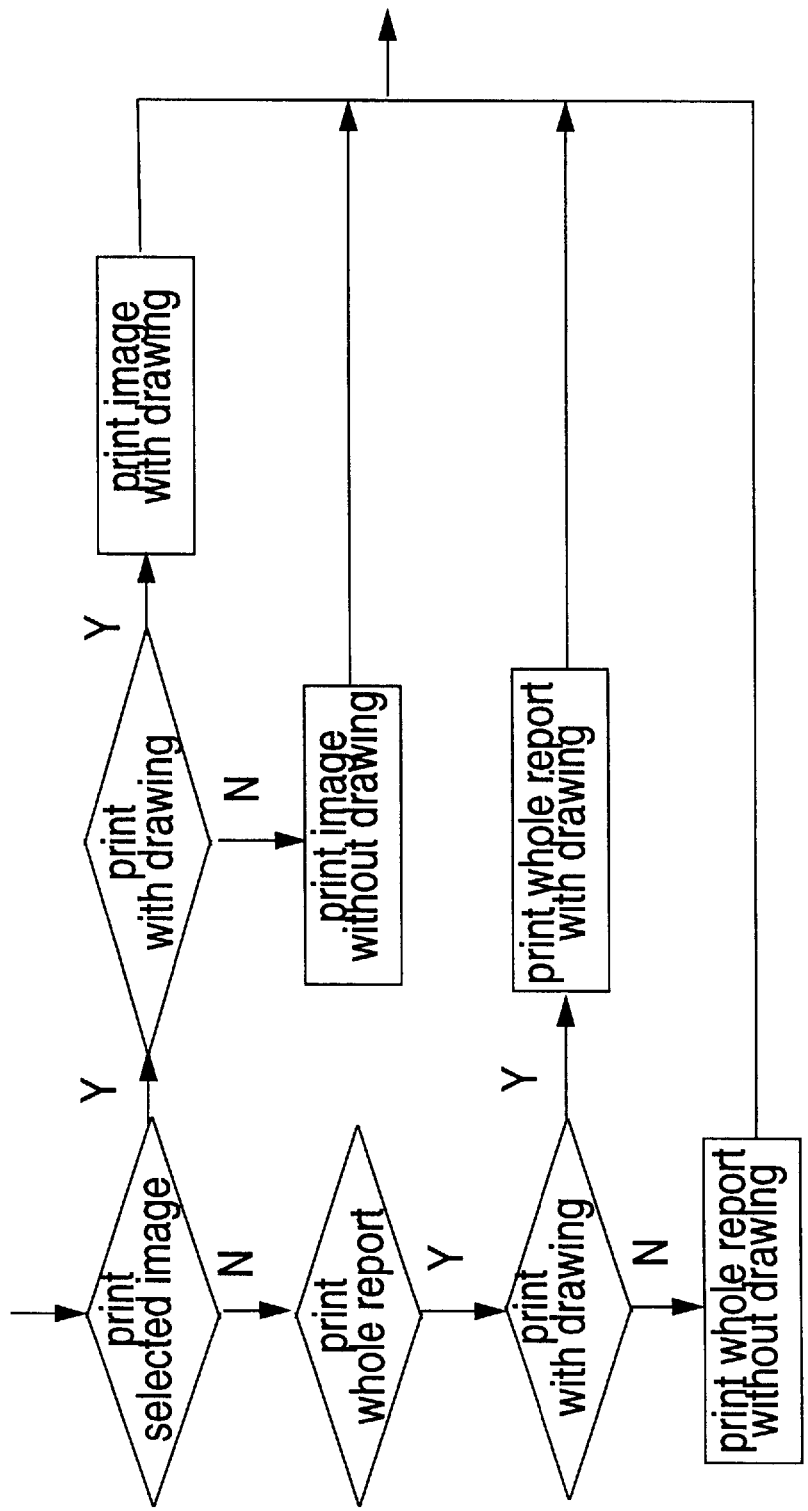
FIG. 8 illustrates the print report handler of the present invention.

FIG. 8 illustrates the print report handler (17 of FIG. 1). The print report handler receives an input from the command interpreter. Within the print report handler, a decision is made as to whether to print a selected image. If a decision is made to print the selected image, a decision is made as to whether to print with a drawing. If a decision is made to print the image with the drawing, the image is printed with the drawing. If a decision is made to print the image without the drawing, the image is printed without the drawing. If a decision is made to not print the selected image, a decision is made as to whether the whole report should be printed. If a decision is made to print the whole report, a decision is made as to whether the whole report should be printed with the drawing. If it is decided to print the whole report with the drawing, the whole report is printed with the drawing. If it is decided to print the whole report without the drawing, the whole report is printed without the drawing. After printing, the print report handler is exited.

Figure 9:
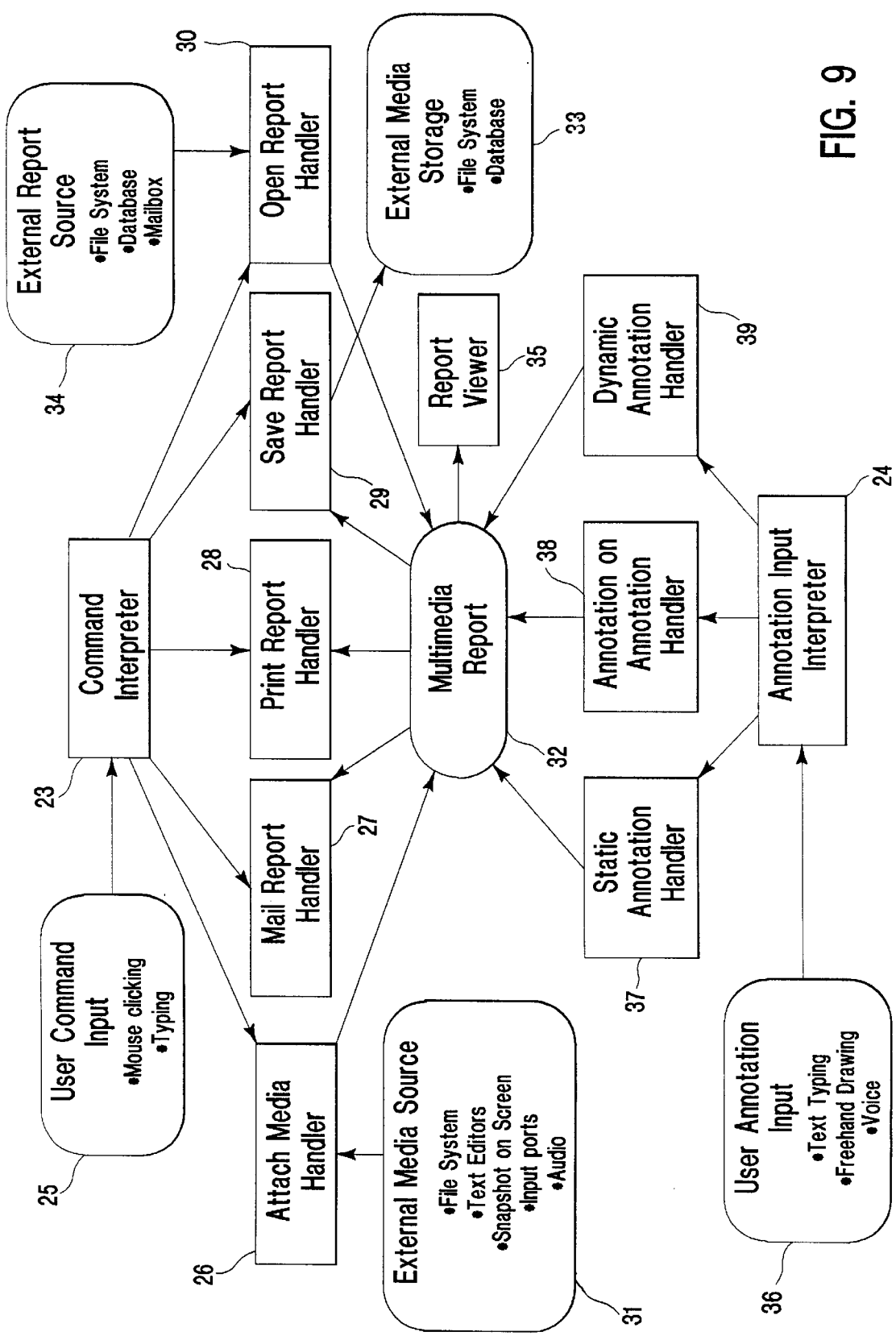
FIG. 9 illustrates a high level functional description of the present invention.

FIG. 9 shows a high level functional description of the reporting system of the present invention. The command interpreter 23 provides an interface between the user command input 25, which includes mouse clicking or typing, and the attach media handler 26, the mail report handler 27, the print report handler 28, the save report handler 29 and the open report handler 30. The attach media handler 26 attaches media types of text, images, graphics and audio from an external media source 31, into the multimedia report 32. The external media source 31 could include a file system, text editors, snapshots on a screen, input ports or audio. The mail report handler 27 connected to the multimedia report 32 generates an e-mail message for delivery. The print report handler 28 connected to the multimedia report 32 generates a print file for printing. The save report handler 29 connected to the multimedia report 32 generates report files for storage in the external media storage 33 which includes a file system or a database. The open report handler 30 opens a report from the external report source 34 which includes a file system, a database or a mailbox. The report viewer 35 includes a screen and provides for the display of the content of the report 32 on the screen.

The annotation input interpreter 24 provides an interface between the user annotation input 36, which includes text typing, free-hand drawing and voice and the static annotation handler 37, the annotation on annotation handler 38 and the dynamic annotation handler 39. The static annotation handler 37 allows the individual to add drawings and text to the report. The annotation on annotation handler 38 allows the individual to record a session of dynamic annotation based on a segment of existent dynamic annotation. The dynamic annotation handler 39 allows the individual to record/playback annotations on canvas from the user annotation input 36.

The multimedia report 32, which is displayed on a computer screen (not shown), has a canvas in which media data objects can be included. The data objects in the canvas can be images and graphics. These objects can be arranged freely according to the report viewer's need. For example, if the system is being used by a doctor, the doctor can overlap two heart images so that two relevant portions of these heart images are close to each other. The doctor can freely draw lines or type text on the canvas. The lines which are drawn on a data object become part of the data object. Thus, if the individual moves an image, the lines on it are also moved along with the image. The text which is typed inside a data object becomes part of the data object; otherwise, it does not belong to any data object.

Figure 10:
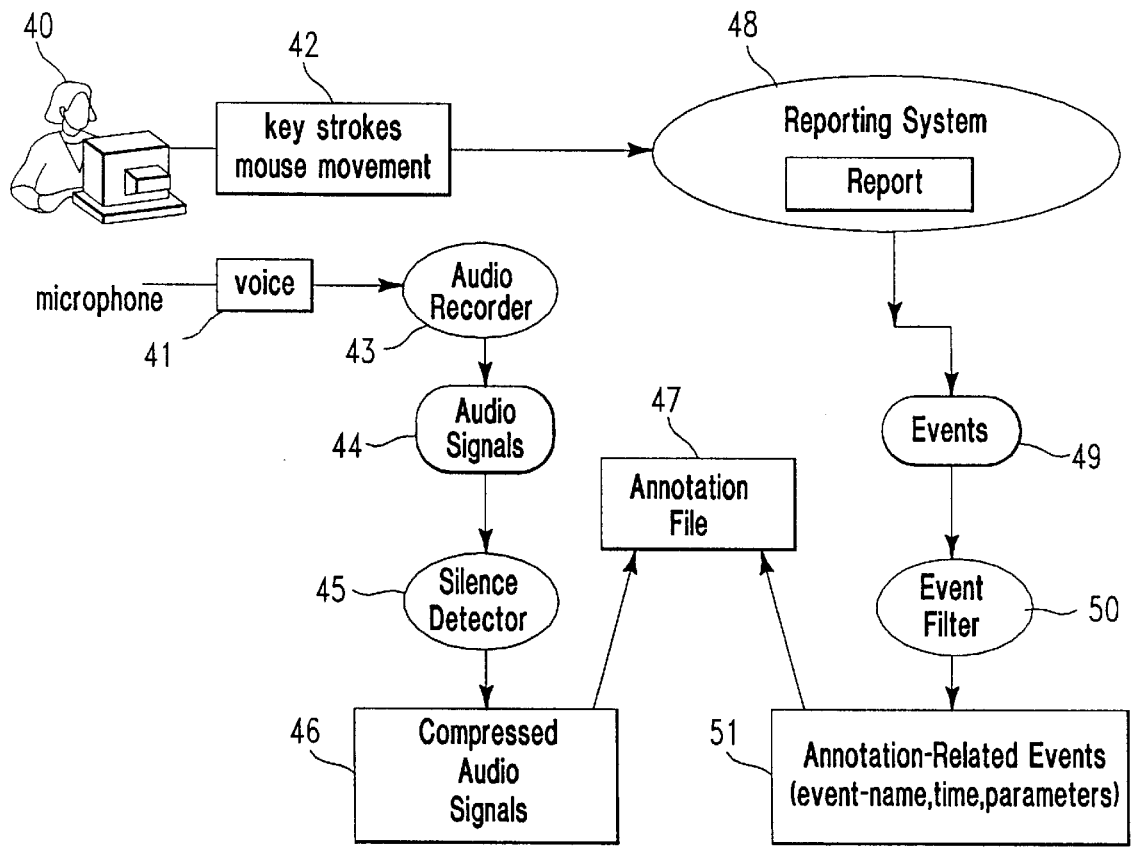
FIG. 10 illustrates a diagrammatic representation of recording a dynamic annotation.

When the individual feels a need to record a session of his/her actions on the canvas as well as his/her voice, he/she would follow the flowchart of FIG. 10. Recording involves the dynamic annotation handler 39, the user annotation input 36 and the multimedia report 32 of FIG. 9. The individual 40 (1) uses the microphone to record his/her voice 41; (2) uses the mouse to draw lines by holding down mouse buttons 42; (3) uses the mouse to gesture by passing the pointer on the canvas without holding down mouse buttons 42; (4) uses the keyboard to type text 42; or (5) manipulates data objects in the canvas. The individual can pause/resume the recording. The voice 41 flows to an audio recorder 43 and is converted to audio signals 44 which flow through a silence detector 45 and become compressed audio signals 46 that are input to the annotation file 47. The key strokes or mouse movement 42 flow through the reporting system 48 and provide events 49 which are filtered by event filter 50. The annotation-related events (event-name, time, parameters) 51 are input to the annotation file 47.

During recording, only significant events are recorded. Two types of discrete events are included: the user-activated events and the time-sliced events. The user-activated events have the format (event_name, time, parameters):

(load, time, object#): load a data object into the canvas
(move, time, object#): start moving a data object in the canvas
(move-to-front, time, object#): move a data object to the front of other objects in the canvas
(move-to-back, time, object#): move a data object to the back of other objects in the canvas
(zoom, time, object#, factor#): zoom in/out an image object in the canvas
(place, time, object#, x_pos, y_pos): place data object at a specific location in the canvas
(type, time, char_value, x_pos, y_pos): type a text character at a specific location in the canvas
(erase-text, time, char_value, x_pos, y_pos): erase single character at a specific location in the canvas
(erase-text, time, all): erase all text in the canvas
(change-text-color, time, color_value): change the color for typing text
(change-line-color, time, color_value): change the color for drawing line
(push-button, time, x_pos, y_pos): push the left button in the canvas
(release-button, time, x_pos, y_pos): release the left button in the canvas
(erase-graphics, time, x_pos, y_pos): erase the line segment in the canvas
(mouse-enter, time, x_pos, y_pos): mouse enters the canvas
(mouse-leave, time, x_pos, y_pos): mouse leaves the canvas The time-sliced events are events which are generated by the computer system. They are used to record the path of the mouse pointer which is on the canvas. These events are represented as (mouse-location, time, pos_x, pos_y): the mouse pointer location in the canvas.

Figure 11:
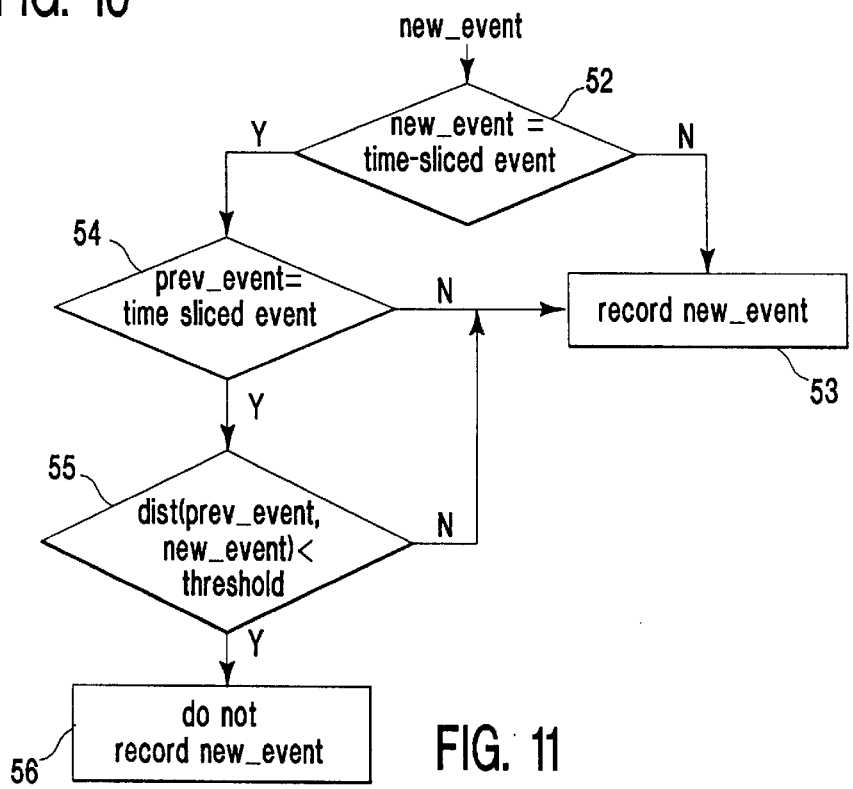
FIG. 11 illustrates the filter that filters out redundant time-sliced events during recording.

The frequency of generating the time-sliced events depends on the process power of the computer. Due to the possibility of redundant generation of this type of events (one example is the mouse pointer stays on the canvas without moving while the individual is holding down the mouse button), a filtering mechanism, as shown in FIG. 11, is provided to determine if a time-sliced event should be recorded.

The filtering of events begins by entering the new_event into decision block 52 where there is a decision whether the new_event is a time-sliced event. If the new event is not a time-sliced event, the new_event is recorded as shown by block 53. If the new_event is a time-sliced event, decision block 54 determines whether the prev_event is a time-sliced event. If the prev_event is not a time-sliced event, the new_event is recorded as shown by block 53. If the prev_event is a time-sliced event, decision block 55 determines whether the distance between the prev_event and the new_event, denoted as dist(prev_event, new_event), is less than a threshold. If the dist(prev_event, new_event) is not less than the threshold, the new_event is recorded as shown by block 53. If the dist(prev_event, new_event) is less than the threshold, the new_event is not recorded as shown by block 56.

Figure 12:
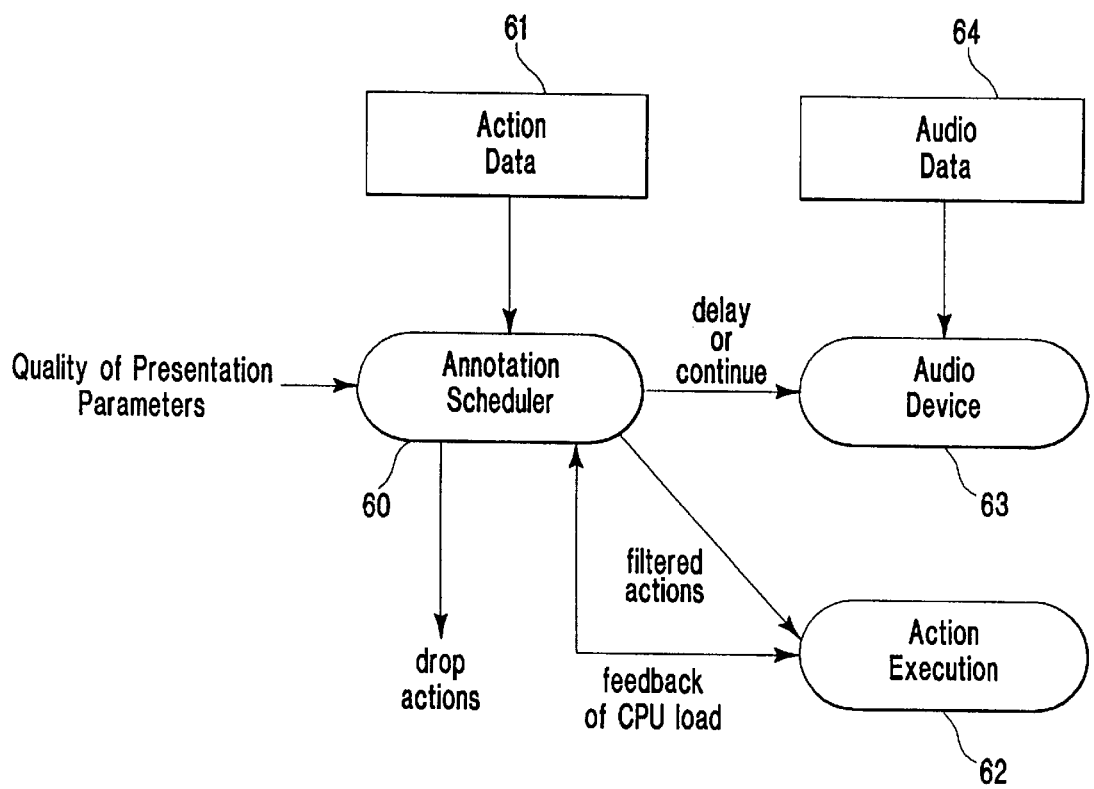
FIG. 12 illustrates a diagrammatic representation of the adaptive synchronization during annotation playback.

For annotation playback, the dynamic annotation handler 39, the multimedia report 32 and the report viewer 35 of FIG. 9 are involved. During the annotation playback, the adaptive synchronization technique is applied in order to synchronize the annotator's actions and voice. This is needed when the CPU load is high. Two mechanisms of the adaptive synchronization technique are utilized: drop actions and continue audio silence. In FIG. 12, the annotation scheduler 60 schedules for each lip-sync interval of the annotation session. Information from the action data 61 and feedback of the CPU load from the action execution 62 is provided to the annotation scheduler 60. The quality of presentation parameters is also provided to the annotation scheduler 60. The annotation scheduler drops actions, provides a delay or continue signal to the audio device 63 and provides filtered actions to the action execution 62. The audio device 63 also receives input from the audio data 64.

Figure 13:
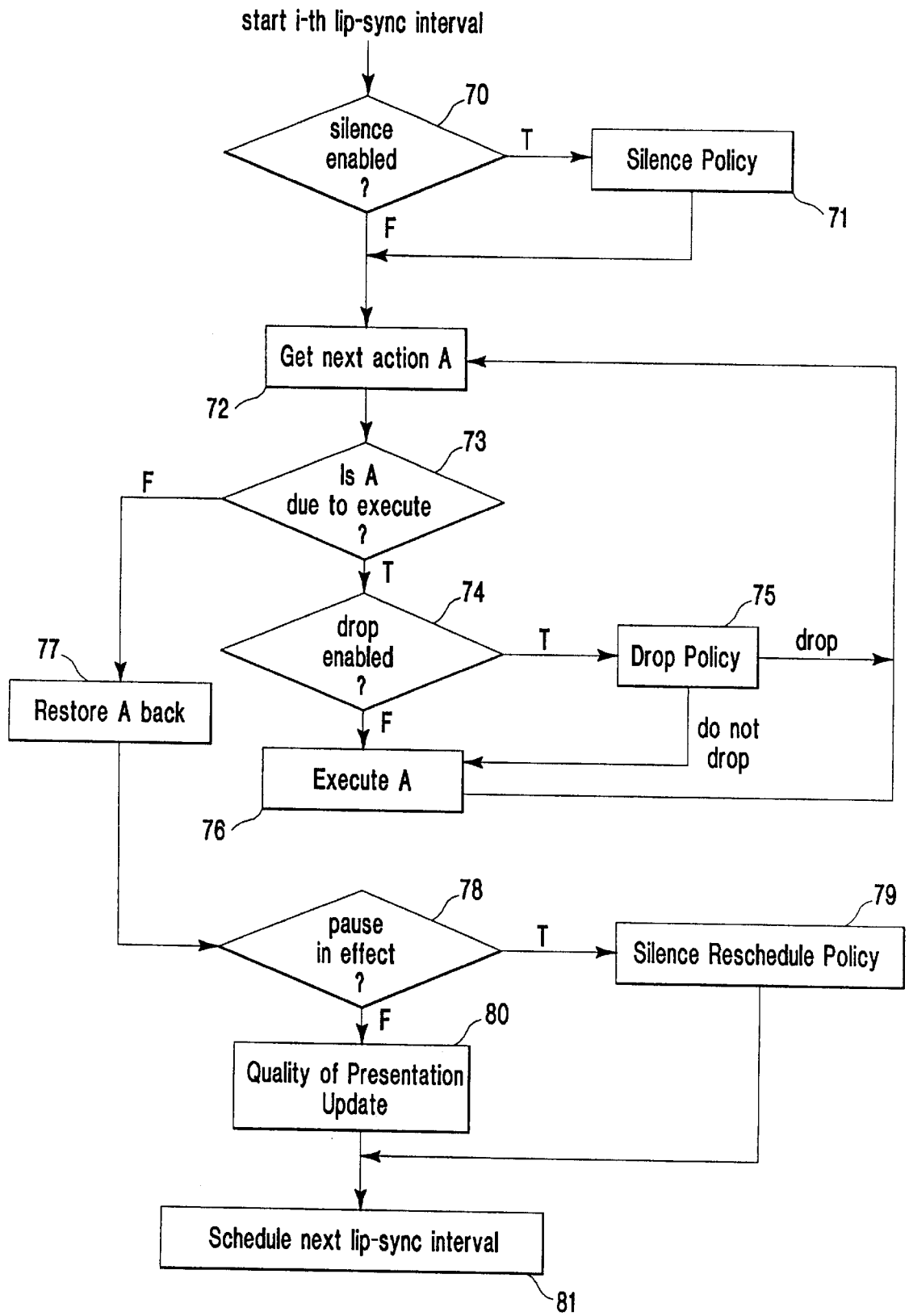
FIG. 13 illustrates a flowchart of the annotation scheduler to perform a lip-sync interval.

FIG. 13 is the flowchart of the annotation scheduler. The flow starts with the i-th lip sync interval and decision block 70 determines whether silence is enabled. If silence is enabled, the silence policy block 71 performs the audio pause at the next audio silence time, and sets the pause in effect. If silence is not enabled, block 72 gets the next action A. Decision block 73 determines whether A is due to execute within the i-th lip sync interval. If A is due to execute, decision block 74 determines whether drop is enabled. If drop is enabled, the drop policy block 75 checks if the action to be executed can be dropped based on the spatial threshold value at that moment. If drop is not enabled, A is executed as shown by the execute A box 76. The flow then returns to block 72. If decision block 73 determines that A is not due to execute, A is restored back in the restore A back block 77. Decision block 78 determines whether pause is in effect. If pause is in effect, the silence reschedule policy block 79 resumes audio play and resets conditions on drop, pause, and silence. If pause is not in effect, the quality of presentation update block 80 sets the spatial threshold, the drop condition, and the silence condition based on the CPU load. The CPU load is calculated as the ratio of the delayed time of the last action between the current lip-sync interval and the previous lip-sync interval. The flow concludes by scheduling the next lip-sync interval in block 81.

In the report viewer, 35 of FIG. 9, the dynamic annotation can be displayed along a time-line with some markers as illustrated in FIG. 14. These markers are used to specify annotation segments for playing back or for reply. Four types of markers are used: object-region markers, drawing markers, gesturing markers and voice-silence markers.

Object-region markers indicate which data object the mouse pointer is pointing at along the time line. For the purpose of visual display, these markers divide the time line into several regions, each representing one data object that the mouse pointer is located. Furthermore, each region is color-coded to distinguish different data objects. The white-colored region indicates the mouse pointer is not located in any data object. Drawing markers indicate that the mouse pointer is in the drawing mode in which the movement of the mouse pointer leaves a trace of the line drawings. Gesturing markers indicate that the mouse pointer is in the gesturing mode in which the movement of the mouse pointer does not leave a trace of the line drawings. The silence parts of the human voice are used as voice-silence markers to indicate which portions of the annotation have human voice.

In FIG. 14, the object-region markers divide the time-line into time intervals, a, b, c, d, and e. Intervals a and d indicate the time when the mouse pointer is located at the same data object. Intervals b and e indicate the time when the mouse pointer is located at the other data object. Interval c indicates the mouse pointer is not located at any data object during that time interval. The drawing markers identify three time intervals, f, g, and h. These intervals indicate the time when the individual is using the mouse pointer to draw lines. The gesturing markers identify four time intervals, i, j, k, and l. These intervals indicate the time when the individual is using the mouse pointer to gesture. The voice-silence markers identify four time intervals, n, o, p, and q. These intervals indicate the time when the individual is talking. The voice silence markers, the object-region markers, the drawing markers and the gesturing markers represent multichannels and with the time-line represent a continuous multichannel presentation.

FIG. 15 illustrates annotation on annotation. Using markers along the time line, the individual can select the desired segment of the annotation. For a selected segment, the individual can play it back. Besides, the individual can make a new annotation which is the reply to this selected segment. A visualization tool is provided for the individual to easily visualize the relations among annotations and replying annotations. Annotation #1 has three segments, a, b, and c. Annotation #2 is a reply to segment b of annotation #1. Annotation #2 itself is segmented into d, e and f. Annotation #3 is a reply to segment e of annotation #2.

There are three important aspects of the present invention. The content of the reports goes beyond other available reporting systems by having dynamic annotation capability. With this dynamic annotation capability, the report can also serve as a consultation tool for other individuals to add their comments by using dynamic annotations. The segmentation of annotations and display of related annotations enable the individual to identify related annotations.

It is not intended that this invention be limited to the software arrangement, or operational procedures shown disclosed. This invention includes all of the alterations and variations thereto as encompassed within the scope of the claims as follows.

We claim:

1. A multimedia-based reporting system comprising:
   a command interpreter for receiving user command inputs;
   an attach media handler connected to said command interpreter;
   an annotation input interpreter for receiving user annotation inputs; and,
   a dynamic annotation handler connected to said annotation input interpreter wherein said dynamic annotation handler comprises:
      an adaptive synchronizer for synchronizing actions and voice; and
      continuous multichannel presentation means.

2. A multimedia-based reporting system as claimed in claim 1 further comprising:
   a print report handler connected to said command interpreter;
   a save report handler connected to said command interpreter; and,
   an annotation on annotation handler connected to said annotation input interpreter.

3. A multimedia-based reporting system as claimed in claim 2 wherein said annotation on annotation handler comprises:
   display means for displaying segmented annotations using markers;
   user selection means to allow said user to select a segment;
   record means to record said segment; and,
   playback means to playback said segment.

4. A multimedia-based reporting system as claimed in claim 1 further comprising:
   a mail report handler connected to said command interpreter;
   an open report handler connected to said command interpreter;
   a static annotation handler connected to said annotation input interpreter; and
   an annotation on annotation handler connected to said annotation input interpreter.

5. A multimedia-based reporting system as claimed in claim 4 further comprising:
   a delete current report handler connected to said command interpreter; and,
   a report viewer for displaying the content of a report.

6. A multimedia-based reporting system as claimed in claim 1 wherein said dynamic annotation handler further comprises:
   recording means; and,
   playback means.

7. A multimedia-based reporting system as claimed in claim 6 wherein said recording means comprises:
   audio recorder means for receiving voice and for converting said voice into audio signals;
   silence detector means connected to said audio recorder means for receiving said audio signals;
   compression means connected to said silence detector means for compressing said audio signals;
   key stroke/mouse movement means for identifying typing or movement of a mouse;
   event generation means connected to said key stroke/mouse movement means for generating events created by said typing or movement of said mouse;
   filter means connected to said event generation means for filtering said events;
   annotation related event means connected to said filter means for receiving filtered events and for providing event-name, time, parameters; and,
   annotation file means connected to said compression means for receiving compressed audio signals and connected to said annotation related event means for receiving said event-name, time, parameters.

8. A multimedia-based reporting system as claimed in claim 7 wherein said filter means comprises:
   a first decision means to determine whether a new_event is equal to a time sliced event;
   a second decision means to determine whether a prev_ event is equal to said time sliced event;
   recording means for recording said new_event;
   a third decision means to determine whether dist(prev_ event, new_event) is less than a threshold; and,
   means for not recording said new_event.

9. A multimedia-based reporting system as claimed in claim 1 wherein said adaptive synchronizer comprises:
   annotation scheduler means for receiving information from action data and for scheduling each interval of an annotation schedule;
   audio device interface means connected to said annotation scheduler; and,
   action execution means connected to said annotation scheduler means for receiving filtered actions from said annotation scheduler means and for providing feedback of CPU load to said annotation scheduler means.

10. A method of preparing multimedia based reports comprising the steps of:
   receiving user command inputs and user annotation inputs;
   attaching media from an external media source;
   opening a report from an external report source;
   performing static annotation; and,
   performing dynamic annotation wherein performing dynamic annotation comprises the step of:
      utilizing an adaptive synchronizer for synchronizing actions and voice; and
      providing a continuous multichannel presentation.

11. A method of preparing multimedia based reports as claimed in claim 10 further comprising the steps of:
   printing said report;
   saving said report in an external media storage; and,
   performing annotation on annotation.

12. A method of preparing multimedia based reports as claimed in claim 11 further comprising the steps of:
   mailing said report; and,
   displaying said report.

13. A method of preparing multimedia based reports as claimed in claim 11 wherein performing annotation on annotation comprises the steps of:
   displaying segmented annotations using markers;
   allowing a user to select a segment;
   annotating on said segment; and,
   playing back said segment or related segments of said segment.

14. A method of preparing multimedia based reports as claimed in claim 11 wherein performing dynamic annotation further comprises the steps of:
   recording; and,
   playing back.

15. A method of preparing multimedia based reports as claimed in claim 14 wherein recording comprises the steps of:
   utilizing audio recorder means for receiving voice and for converting said voice into audio signals;
   utilizing silence detector means connected to said audio recorder means for receiving said audio signals;
   compressing said audio signals;
   identifying typing or movement of a mouse;
   generating events created by said typing or movement of said mouse;
   filtering said events;
   utilizing annotation related event means for receiving filtered events and for providing event-name, time, parameters; and,
   utilizing annotation file means for receiving compressed audio signals and for receiving said event-name, time, parameters.

16. A method of preparing multimedia based reports as claimed in claim 15 wherein filtering comprises the steps of:
   determining whether a new_event is a time-sliced event;
   determining whether a prev_event is said time-sliced event;
   recording said new_event if said new_event is not said time-sliced event;
   determining whether dist(prev_event, new_event) is less than a threshold;
   recording said new_event if said new_event and said prev_event are time-sliced events and if dist(prev_event, new_event) is not less than said threshold; and,
   not recording said new_event if dist(prev_event, new_event) is less than said threshold.

17. A method of preparing multimedia based reports as claimed in claim 10 wherein utilizing an adaptive synchronizer comprises the steps of:
   utilizing annotation scheduler means for receiving information from action data and for scheduling each interval of an annotation schedule;
   utilizing audio device interface means connected to said annotation scheduler; and,
   utilizing action execution means connected to said annotation scheduler means for receiving filtered actions from said annotation scheduler means and for providing feedback of CPU load to said annotation scheduler means.

18. A multimedia-based reporting system comprising:
   a command interpreter for receiving user command inputs;
   an attach media handler connected to said command interpreter and a multimedia report for receiving external media from an external media source;
   a mail report handler connected to said command interpreter and said multimedia report;
   a print report handler connected to said command interpreter and said multimedia report;
   a save report handler connected to said command interpreter and said multimedia report for saving said multimedia report to an external media storage;
   an open report handler connected to said command interpreter and said multimedia report for receiving external reports from an external report source;
   an annotation input interpreter for receiving user annotation inputs;
   a static annotation handler connected to said annotation input interpreter and said multimedia report;
   an annotation on annotation handler connected to said annotation input interpreter and said multimedia report;
   a dynamic annotation handler connected to said annotation input interpreter and said multimedia report; and,
   a report viewer for displaying content of said multimedia report wherein said dynamic annotation handler comprises:
      adaptive synchronization means for synchronizing actions and voice; and
      continuous multichannel presentation means.

* * * * *